United States Patent
Mountanos et al.

(10) Patent No.: US 9,420,217 B2
(45) Date of Patent: Aug. 16, 2016

(54) PROGRAM IDENTIFIER BASED RECORDING

(75) Inventors: Pete Mountanos, Redwood City, CA (US); Anton Kucer, Redmond, WA (US); Prakash Duggaraju, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 13/587,947

(22) Filed: Aug. 17, 2012

(65) Prior Publication Data

US 2014/0050459 A1 Feb. 20, 2014

(51) Int. Cl.
*H04N 9/80* (2006.01)
*H04N 5/76* (2006.01)
(Continued)

(52) U.S. Cl.
CPC ............... *H04N 5/76* (2013.01); *H04H 60/13* (2013.01); *H04H 60/27* (2013.01); *H04H 60/372* (2013.01); *H04H 60/40* (2013.01); *H04H 60/65* (2013.01); *H04H 60/74* (2013.01); *H04N 21/26283* (2013.01); *H04N 21/4147* (2013.01); *H04N 21/4334* (2013.01); *H04N 21/8133* (2013.01); *H04N 21/8456* (2013.01)

(58) Field of Classification Search
CPC ..... H04H 60/13; H04H 60/27; H04H 60/372; H04H 60/40; H04H 60/65; H04H 60/74; H04N 21/26283; H04N 21/4147; H04N 21/4334; H04N 21/8133; H04N 21/8456; H04N 5/76
USPC .......... 386/326, 239–262, 291–299; 709/231, 709/246; 725/105, 110
See application file for complete search history.

(56) References Cited

U.S. PATENT DOCUMENTS 7,245,819 B1 * 7/2007 Sanders ............... G11B 27/034
386/241
7,725,002 B2 5/2010 Nakajima et al.
(Continued)

OTHER PUBLICATIONS

Annesley, et al., "An Extension of the AVC File Format for Video Surveillance", Retrieved at <<http://ieeexplore.ieee.org/stamp/stamp.jsp?tp=&arnumber=5289347>>, Proceeding: Third ACM/IEEE International Conference on Distributed Smart Cameras, Aug. 30, 2009, p. 1-8.
(Continued)

*Primary Examiner* — Thai Tran
*Assistant Examiner* — Stephen Smith
(74) *Attorney, Agent, or Firm* — Aaron Chatterjee; Judy Yee; Micky Minhas (57) ABSTRACT

Example apparatus and methods concern recording content based on program identifier information included in a fragment of the content. Example apparatus and methods facilitate identifying a content fragment (e.g., f-MP4 fragment) based on an identifier located in the fragment rather than information located in some external source (e.g., Event Information Table (EIT)). One example method includes identifying a fragment based, at least in part, on a program identifier (PI) encoded as a universally unique identifier (UUID) in the fragment and then selectively recording the fragment based, at least in part, on the PI. Rather than rely only on a predicted start time, a predicted start time, and a predicted channel, example apparatus and methods may be better prepared to account for unanticipated start times, ending times, schedule changes, channel changes, and other changes that may frustrate users.

15 Claims, 8 Drawing Sheets (51) Int. Cl.
*H04N 21/4147* (2011.01)
*H04N 21/433* (2011.01)
*H04H 60/13* (2008.01)
*H04H 60/27* (2008.01)
*H04H 60/37* (2008.01)
*H04H 60/40* (2008.01)
*H04H 60/65* (2008.01)
*H04H 60/74* (2008.01)
*H04N 21/262* (2011.01)
*H04N 21/81* (2011.01)
*H04N 21/845* (2011.01)

(56) References Cited

U.S. PATENT DOCUMENTS

| | | | |
|---|---|---|---|
| 7,817,903 B2 | 10/2010 | Suneya | |
| 2002/0110360 A1 | 8/2002 | Potrebic | |
| 2009/0303339 A1 | 12/2009 | Kudo et al. | |
| 2009/0319563 A1 | 12/2009 | Schnell | |
| 2011/0093617 A1* | 4/2011 | Igarashi | H04N 21/23406 709/246 |
| 2011/0194833 A1* | 8/2011 | Jong | H04N 5/782 386/248 |
| 2011/0246616 A1* | 10/2011 | Ronca | H04N 21/26258 709/219 |
| 2011/0254926 A1 | 10/2011 | Ushiki et al. | |
| 2012/0020651 A1* | 1/2012 | Gilson | H04N 5/782 386/296 |
| 2012/0033939 A1 | 2/2012 | Murakami | |
| 2012/0272281 A1* | 10/2012 | Ha | H04N 21/23439 725/110 |
| 2012/0330950 A1* | 12/2012 | Pichumani | H04L 65/4076 707/736 |
| 2013/0067036 A1* | 3/2013 | Nooney | H04L 65/4084 709/219 |
| 2013/0198401 A1* | 8/2013 | van Doorn | H04L 65/607 709/231 |

OTHER PUBLICATIONS

"International Search Report & Written Opinion for PCT Patent Application No. PCT/US2013/055224", Mailed Date: Nov. 20, 2013, Filed Date: Aug. 16, 2013, 10 Pages.

"Unifying Global Video Strategies—MP4 File Fragmentation for Broadcast, Mobile and Web Delivery" A Transitions in Technology White Paper, Nov. 16, 2011, 16 Pages.

* cited by examiner

|  | 410 | 420 | 430 | 440 |  |
|---|---|---|---|---|---|
| 10 Mbps | ProgramUniqueID 123 NTP(00:00:00) | ProgramUniqueID 123 NTP(00:00:00) | ProgramUniqueID 124 NTP(00:00:04) | ProgramUniqueID 124 NTP(00:00:04) | 4050 |
| 1 Mbps | ProgramUniqueID 123 NTP(00:00:00) | ProgramUniqueID 123 NTP(00:00:00) | ProgramUniqueID 124 NTP(00:00:04) | ProgramUniqueID 124 NTP(00:00:04) | 4060 |
| 100 Kbps | ProgramUniqueID 123 NTP(00:00:00) | ProgramUniqueID 123 NTP(00:00:00) | ProgramUniqueID 124 NTP(00:00:04) | ProgramUniqueID 124 NTP(00:00:04) | 4070 |
| 10 Kbps | ProgramUniqueID 123 NTP(00:00:00) | ProgramUniqueID 123 NTP(00:00:00) | ProgramUniqueID 124 NTP(00:00:04) | ProgramUniqueID 124 NTP(00:00:04) | 4080 |
| 1 Kbps | ProgramUniqueID 123 NTP(00:00:00) | ProgramUniqueID 123 NTP(00:00:00) | ProgramUniqueID 124 NTP(00:00:04) | ProgramUniqueID 124 NTP(00:00:04) | 4090 |

PROGRAM IDENTIFIER BASED RECORDING

BACKGROUND

Conventional time based recording too often leads to . . . "this is it, the championship is on the line. The snap is good, the hold is good, the kick is up, and . . . " And then your digital video recorder (DVR) informs you that the recording has ended. You programmed the DVR very carefully so that it would start recording on a selected channel a half hour before the big game and so that it would keep recording that selected channel for a half hour after the big game was scheduled to end. But the game went into overtime and ran extra-long. Therefore your DVR did not record the end of the most amazing game in the history of the universe. To add insult to injury, your DVR failed to record the first thirty one minutes of the season premiere of your favorite show, which was scheduled to start after the big game.

Traditional recording solutions, both audio and video, are based on recording content from a certain channel (e.g., television, radio) starting at a certain time and ending at a certain time. However, several issues have frustrated users of these traditional recording solutions. One issue, where a game or other live broadcast runs long (or short), is well known to many users. The unanticipated timing change may affect not only the big game, but also shows that follow the big game. Another issue occurs due to the lack of coordination between what time the content provider (e.g., network) thinks it is and what time the content receiver (e.g., home DVR) thinks it is. With increased usage of unmanaged networks for content delivery, this lack of coupling between provider time and receiver time can lead to a recording neither starting nor stopping on time. For example, clock drift may cause a recording device to start or stop at a time other than the actual start or stop time. An unmanaged network may be, for example, a network that does not have central control or that does not have quality of service capability.

A third issue has also frustrated users of traditional recording solutions. This third issue is a simple scheduling change, where a program that was supposed to run on Wednesday from seven to eight is moved to Thursday from eight to nine. Some attempts have been made to deal with schedule changes using updates to event information tables (EIT). However, some content delivery mechanisms (e.g., MP4 (MPEG-4 (Moving Pictures Experts Group))), do not include an EIT. Even if an EIT was included, the issue of clock drift leading to a mismatch between provider clock time and receiver clock time still exists.

Yet another issue that can frustrate recording is an unscheduled channel change. A program that was scheduled to run on television channel eight may instead run on television channel thirteen. The program may start and stop on time, but your DVR may not record the program because it moved 'up the dial'.

SUMMARY

This Summary is provided to introduce, in a simplified form, a selection of concepts that are further described below in the Detailed Description. This Summary is not intended to identify key features or essential features of the claimed subject matter, nor is it intended to be used to limit the scope of the claimed subject matter.

Example apparatus and methods selectively record a fragmented MPEG-4 (f-MP4) fragment based, at least in part, on the value of a program identifier associated with the f-MP4 fragment. In embodiments, the -MP14 ISO/IEC14496-12 box structure may be configured to include a universally unique identifier (UUID) field that is configured to store a program identifier (PI). In one example, the PI may be a unique program identifier. In different embodiments the uniqueness may be a statistical uniqueness, a substantial uniqueness, an actual uniqueness, or other type of uniqueness. In embodiments, the PI may identify a specific episode of a specific television show, and thus have the same PI when the fragment corresponds to that specific episode. In embodiments, the PI may identify a specific portion of a televised event, such as a specific quarter of a football game. Example apparatus and methods may select fragments to record using this PI-UUID. In one embodiment, recording may be determined solely based on the PI-UUID. In other embodiments, recording may be determined based on the PI-UUID and a combination of other factors including, but not limited to, start time, stop time, and channel. In different examples, the methods may be practiced on apparatus including, but not limited to, televisions, digital video recorders, computers, laptop computers, tablet computers, personal electronic devices, and smart phones. In different examples, the methods may be practiced on the receiving device or may be provided as a service (e.g., cloud service).

Example apparatus and methods facilitate recording in real time or in delayed time. In one embodiment, a high bandwidth reception stream may be monitored for fragments that are streaming live and that have the desired PI-UUID. In another embodiment, buffers in which fragments have been stored may be examined to locate desired fragments. The buffers may be examined outside a predicted delivery time. In different embodiments, the buffers may be scanned in response to different actions. For example, buffers may be scanned in response to a user action, may be scanned periodically, may be scanned when a transition from a first PI-UUID to a second PI-UUID is detected, may be scanned as a scheduled event, or may be scanned in response to other events.

Example apparatus and methods facilitate specific recording or opportunistic recording. In one embodiment of specific recording, a specific program on a specific channel is recorded during a target window period of time based on the PI-UUID. In this embodiment, a high bandwidth reception stream may be monitored for the desired content and recording may start before an expected start time and run past an expected end time as controlled by the PI-UUID information. In one embodiment of opportunistic recording, a specific program may be recorded from any available channel at any time based on the PI-UUID. In this embodiment, a low bandwidth reception stream may be monitored for the desired content. When the PI-UUID is detected on the low bandwidth reception stream, a high bandwidth reception stream may be tuned to an appropriate channel and the content retrieved over the high bandwidth reception stream. This embodiment may include verifying that the two different reception streams are synchronized on, for example, group-of-pictures alignment, on f-MP4 boundary alignment, or otherwise.

BRIEF DESCRIPTION OF THE DRAWINGS

The accompanying drawings illustrate various example apparatus, methods, and other embodiments described herein. It will be appreciated that the illustrated element boundaries (e.g., boxes, groups of boxes, or other shapes) in the figures represent one example of the boundaries. In some examples, one element may be designed as multiple elements or multiple elements may be designed as one element. In some examples, an element shown as an internal component

DETAILED DESCRIPTION

Figure 1:
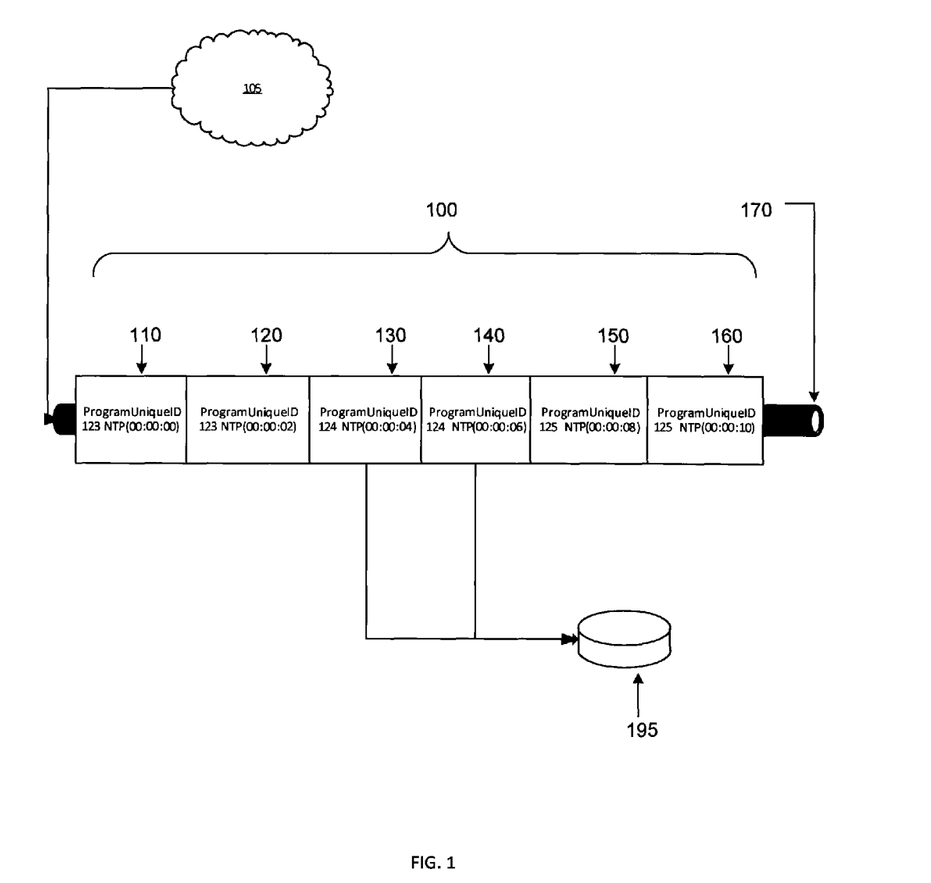
FIG. 1 illustrates an example stream of fragments.

FIG. 1 illustrates an example stream 100 of fragments. Stream 100 includes fragments 110, 120, 130, 140, 150, and 160. While six fragments are illustrated, a stream may include a much greater number (e.g., hundreds, thousands, tens of thousands) of fragments. Fragments may store, for example, two seconds of video content. In one example, corresponding fragments may include the same content but at different quality levels.

Stream 100 may be received on, for example, an Ethernet connection 170. While an Ethernet connection 170 is illustrated, stream 100 may be received on other connections. A connection may be configured to present content from a number of channels (e.g., television channels, FM radio channels, AM radio channels, satellite channels). While multiple channels may be available, to accommodate bandwidth consumption constraints, Ethernet connection 170 may be configured to receive, at different points in time, content from less than all the available channels. The Ethernet connection 170 may be programmed by, for example, a receiving device 195. The receiving device 195 may be, for example, a computer, a laptop computer, a personal electronic device, a tablet computer, a smart phone, or other device. Multiple channels may be available from, for example, a providing device 105.

Fragments 110 and 120 are associated with a program whose program identifier (PI) is 123. Fragments 110 and 120 illustrate this PI as being a field titled ProgramUniqueID. Fragments 110 and 120 may represent "boundary" fragments, and therefore a number of fragments associated with program 123 may be received between fragments 110 and 120.

Similarly, fragments 130 and 140 are associated with a program whose identifier is 124, and fragments 150 and 160 are associated with a program whose identifier is 125. Receiving device 195 may wish to record the program associated identifier 124. Therefore, fragments 110 and 120 will be ignored, fragments 130 and 140 would be recorded, and fragments 150 through 160 would be discarded. Even though fragments 130 and 140 may not begin and end at an expected start and stop time, fragments 130 and 140 may still be recorded allowing complete playback of the entire program.

Some portions of the detailed descriptions that follow are presented in terms of algorithms and symbolic representations of operations on data bits within a memory. These algorithmic descriptions and representations are used by those skilled in the art to convey the substance of their work to others. An algorithm is considered to be a sequence of operations that produce a result. The operations may include creating and manipulating physical quantities that may take the form of electronic values. Creating or manipulating a physical quantity in the form of an electronic value produces a concrete, tangible, useful, real-world result.

It has proven convenient at times, principally for reasons of common usage, to refer to these signals as bits, values, elements, symbols, characters, terms, numbers, and other terms. It should be borne in mind, however, that these and similar terms are to be associated with the appropriate physical quantities and are merely convenient labels applied to these quantities. Unless specifically stated otherwise, it is appreciated that throughout the description, terms including processing, computing, and determining, refer to actions and processes of a computer system, logic, processor, or similar electronic device that manipulates and transforms data represented as physical quantities (e.g., electronic values).

Example methods may be better appreciated with reference to flow diagrams. For simplicity, the illustrated methodologies are shown and described as a series of blocks. However, the methodologies may not be limited by the order of the blocks because, in some embodiments, the blocks may occur in different orders than shown and described. Moreover, fewer than all the illustrated blocks may be required to implement an example methodology. Blocks may be combined or separated into multiple components. Furthermore, additional or alternative methodologies can employ additional, not illustrated blocks.

Figure 2:
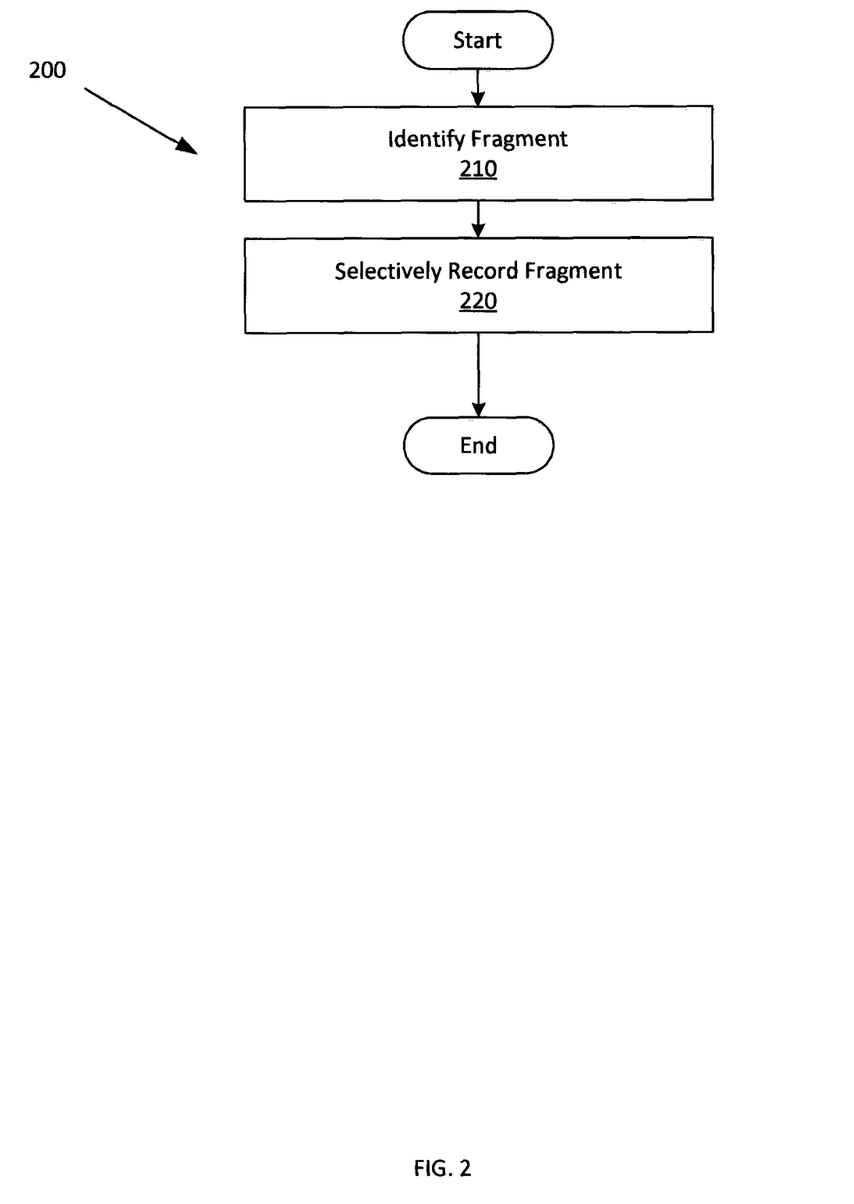
FIG. 2 illustrates an example method associated with program identifier based recording.

FIG. 2 illustrates an example method 200 associated with program identifier based recording. Method 200 includes, at 210, identifying a fragment to record. In one embodiment, identifying a fragment at 210 may include identifying a fragmented MPEG-4 (f-MP4) fragment. The fragment may be identified based, at least in part, on a program identifier (PI) encoded as a universally unique identifier (UUID) in the fragment.

Figure 4:
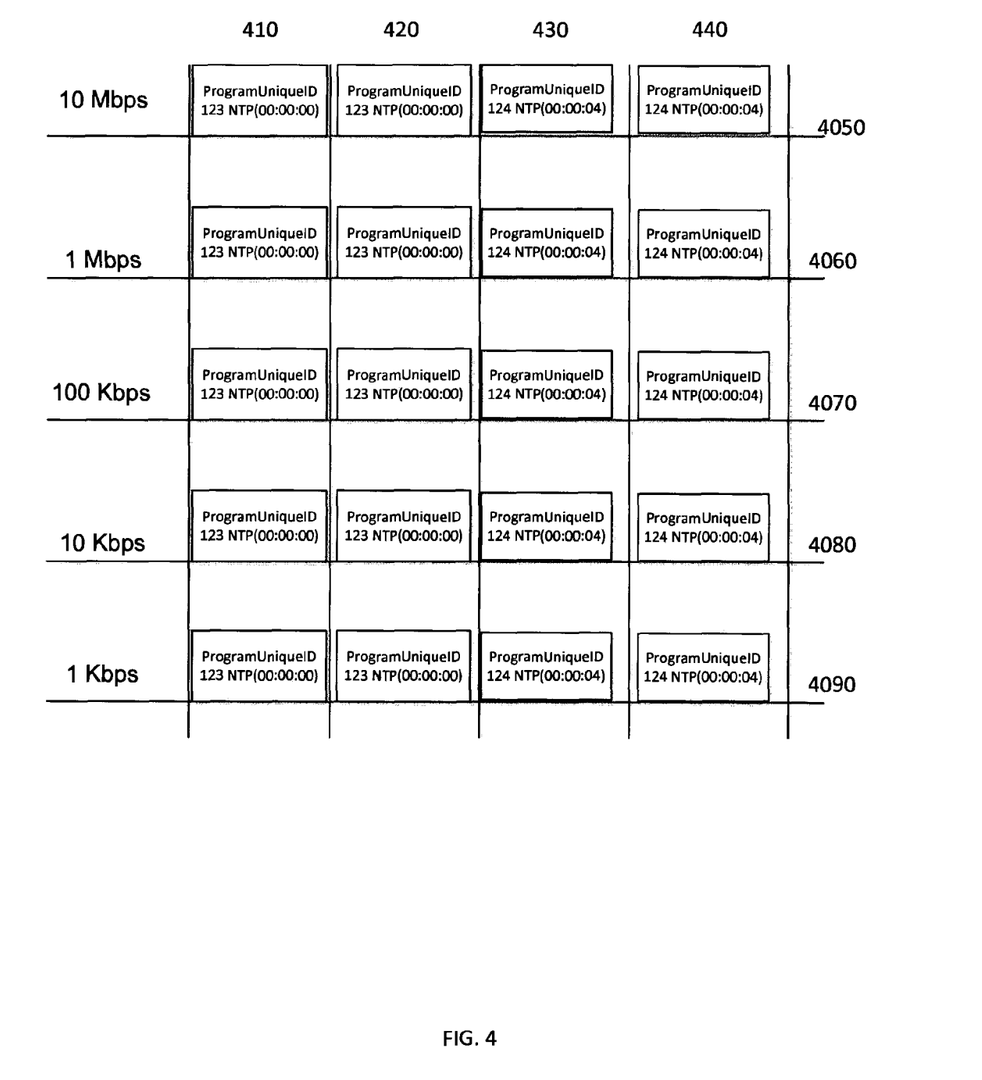
FIG. 4 illustrates example communication streams.

Identifying a fragment at 210 may include examining fragments available on different streams or different connections. In one example, a fragment may be identified on an input stream from which the fragment is to be recorded. In another example, a fragment may be identified on a second input stream that is different from the input stream on which the fragment is to be recorded. For example, as illustrated in FIG. 4, the fragment may be identified on a low bandwidth stream and then the content actually recorded from a higher bandwidth (e.g., video quality) stream. This embodiment may depend on the second input stream and the input stream being aligned with respect to group-of-pictures (GOP) alignment, with respect to fragment boundaries, or in other ways. For example, the streams may be synchronized with respect to f-MP4 fragment alignment. In different embodiments, being synchronized may include being received at the same time, or being received at known offset times. For example, corresponding fragments in a low-resolution stream may be 1 f-MP4, 100 ms, or other intervals ahead of or behind, fragments in a high-resolution stream.

Identifying a fragment at 210 may also include examining things other than live input streams. For example, identifying the fragment at 210 may include identifying the fragment in a data store. The data store may be used to buffer fragments to facilitate non-real-time recording.

Method 200 also includes, at 220, selectively recording an identified fragment. Recording a fragment may include writing the fragment to a memory, to a disk, to a solid state device, or to another device or location. In one embodiment, a fragment may be selectively recorded based, at least in part, on the PI. For example, fragments whose PI matches a desired PI may be recorded while fragments whose PI does not match the desired PI will not be recorded.

In some embodiments, a fragment may be identified based solely on its PI. In other embodiments, a fragment may be identified based solely on a combination of the PI with at least one other criteria or combinations of criteria. Example criteria or combinations of criteria may include (a) a time at which the fragment was received, (b) a channel on which the fragment was received, or (c) a time at which the fragment was received combined with a channel on which the fragment was received.

In different embodiments, method 200 may be performed on a device that is doing the identifying and recording, or method 200 may be performed on a device other than the device that is doing the recording. Therefore, method 200 may include controlling devices including, but not limited to, a television, a digital video recorder, a computer, a laptop computer, a tablet computer, a personal electronic device, and a smart phone to identify and record the fragment. In another embodiment, method 200 may include controlling a service (e.g., cloud service) to identify the fragment and then controlling a device to record the fragment based, at least in part, on an identification provided by the cloud service.

Figure 3:
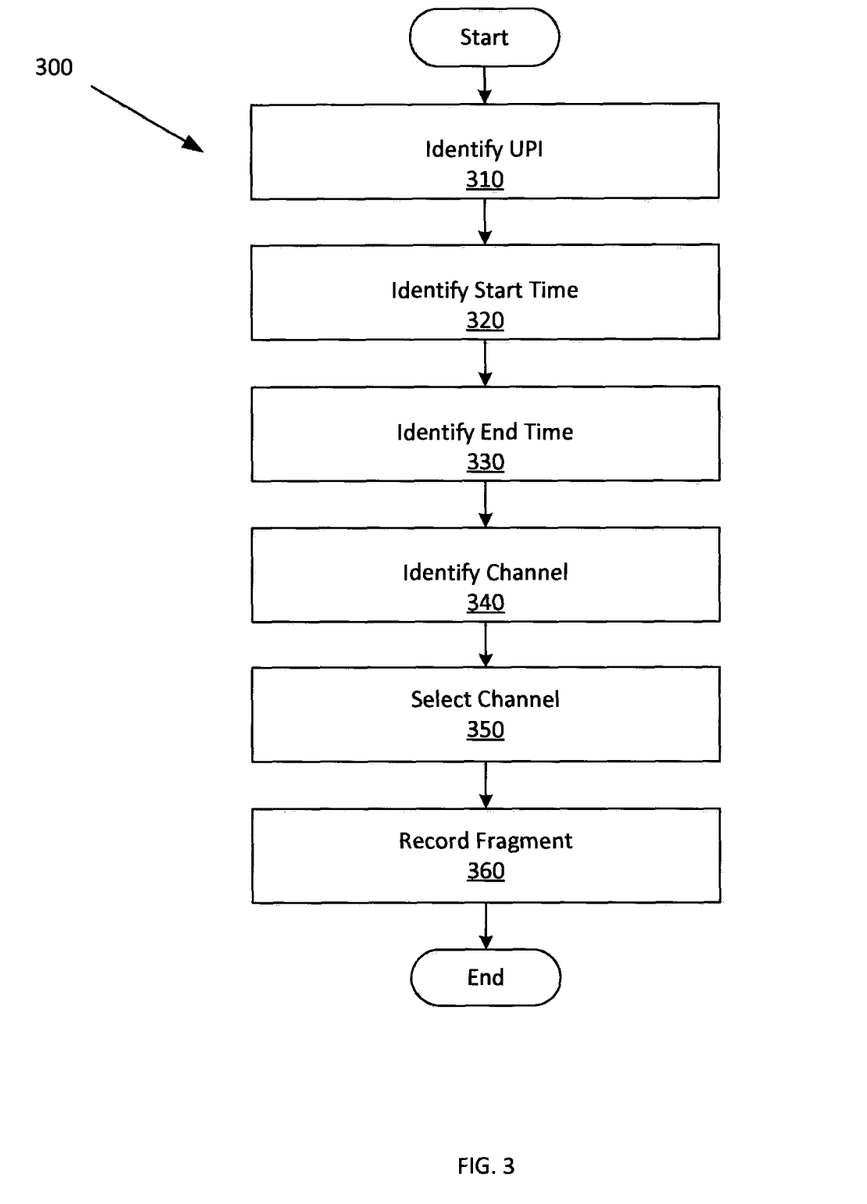
FIG. 3 illustrates an example method associated with program identifier based recording.

FIG. 3 illustrates an example method 300 associated with program identifier based recording. Method 300 includes identifying a PI at 310. In one example, identifying the PI at 310 includes identifying a fragmented MPEG-4 (f-MP4) fragment based on a value of a program identifier (PI) encoded in a universally unique identifier (UUID) field in the fragment. Identifying the PI may involve examining a fragment received on a first stream from which the f-MP4 fragment is to be recorded, on a second stream other than the stream from which the f-MP4 fragment is to be recorded, or in a data store. When a fragment is to be recorded from a stream other than the stream from which the fragment was identified, then in one embodiment the fragments may appear on channels that are aligned on fragment boundaries. The identification can be performed on different devices. Thus, identifying the fragment may occur on devices including, but not limited to, a television, a digital video recorder, a computer, a laptop computer, a tablet computer, a personal electronic device, a smart phone, a service, and a cloud-based service.

Method 300 also includes, at 320, identifying a start time. Identifying the start time may include receiving an input from a user, receiving an input from a service, process, or thread, analyzing a database or table or other data, and other actions. Rather than use the start time as a hard boundary at which time recording will begin, the start time can be used as a recommendation or as a hint concerning when fragments are to be expected. For example, a stream may be examined starting at the recommended time and then recording may begin when a desired ID is observed or until some threshold is met that indicates that the content is unlikely to arrive. This may preserve processing resources during times when desired content is unexpected. Method 300 also includes, at 330, identifying an end time. Identifying the end time may include receiving an input from a user, receiving an input from a service, process, or thread, analyzing a database or table or other data, and other actions. Once again, rather than using the end time as a hard boundary at which time recording will end, the end time can be used as a recommendation or as a hint concerning when fragments are expected to end. For example, a stream may be examined until the recommended end time and then recording may terminate when the desired ID is no longer observed or when some threshold is met that indicates that the content is complete. This may preserve processing resources during times when desired content is unexpected.

Method 300 also includes, at 340, identifying a channel on which fragments are expected. Identifying the channel may include receiving an input from a user, receiving an input from a service, process, or thread, analyzing a database or table or other data, and other actions. Identifying the channel, start time, and end time, may facilitate allocating reception streams or allocating processes or threads to operate on certain reception streams.

Method 300 also includes, at 350, selecting a channel from which fragments are to be recorded. The channel may be selected based on the identification made at 340.

Method 300 also includes, at 360, selectively recording the fragment based, at least in part, on the PI encoded in the UUID field. In one example, recording the fragment at 360 includes controlling a device (e.g., television, computer, laptop computer, tablet computer, personal electronic device, smart phone, a cloud-based service) to write the fragment to a storage device or data store. Whether a particular fragment is recorded may depend on a combination of the PI encoded in the UUID field, a time at which the fragment was received, and a channel on which the fragment was received.

While FIG. 3 illustrates various actions occurring in serial, it is to be appreciated that various actions illustrated in FIG. 3 could occur substantially in parallel. By way of illustration, a first process could identify a PI, a second process could identify start/end time and channel, and a third process could record a fragment. While three processes are described, it is to be appreciated that a greater or lesser number of processes could be employed and that lightweight processes, regular processes, threads, and other approaches could be employed.

In one example, a method may be implemented as computer executable instructions. Thus, in one example, a computer-readable storage medium may store computer executable instructions that if executed by a machine (e.g., computer) cause the machine to perform methods described herein including methods 200 or 300. While executable instructions associated with the above methods are described as being stored on a computer-readable storage medium, it is to be appreciated that executable instructions associated with other example methods described herein may also be stored on a computer-readable storage medium. In different embodiments the example methods described herein may be triggered in different ways. In one embodiment, a method may be triggered manually by a user. In another example, a method may be triggered automatically.

"Computer-readable storage medium", as used herein, refers to a medium that stores instructions or data. "Computer-readable storage medium" does not refer to propagated signals. A computer-readable storage medium may take forms, including, but not limited to, non-volatile media, and volatile media. Non-volatile media may include, for example, optical disks, magnetic disks, tapes, and other media. Volatile media may include, for example, semiconductor memories, dynamic memory, and other media. Common forms of a computer-readable storage medium may include, but are not limited to, a floppy disk, a flexible disk, a hard disk, a magnetic tape, other magnetic medium, an application specific integrated circuit (ASIC), a compact disk (CD), other optical medium, a random access memory (RAM), a read only memory (ROM), a memory chip or card, a memory stick, and other media from which a computer, a processor or other electronic device can read.

FIG. 4 illustrates example communication streams and aligned slots on those communication streams. The communication streams have different bandwidths. For example, stream 4050 may be able to deliver content at 10 Mbps, stream 4060 may be able to deliver content at 1 Mbps, stream 4070 may be able to deliver content at 100 Kbps, stream 4080 may be able to deliver content at 10 Kbps, and stream 4090 may only be able to deliver content at 1 Kbps. While stream 4090 may be unsuitable for receiving video content, stream 4090 may be adequate for receiving fragment metadata. Thus, a PI may be identified on stream 4090, and then the corresponding fragment in the corresponding time slot may be acquired from a higher bandwidth stream (e.g., video quality stream 4050). By way of illustration, a fragment may be delivered during time slot 410. The PI may indicate that the fragment is not to be recorded. Thus the fragment may be ignored. The PI may have been identified using data acquired on stream 4090. Another fragment may be delivered during time slot 420. Once again, the PI may indicate that the fragment is not to be recorded and the fragment will be discarded. Another fragment may be delivered during time slot 430. This fragment may have a PI that indicates that the fragment is to be recorded. Therefore, the fragment present on stream 4050 may be recorded. Since fragments to be recorded are likely to appear in order, the next fragment received on stream 4050 during, for example, time slot 440, may be examined for its PI and, if the PI matches a PI to be recorded, then the fragment will also be recorded. While FIG. 4 illustrates corresponding fragments being aligned, in different embodiments, corresponding fragments may be offset by some known amount.

Figure 5:
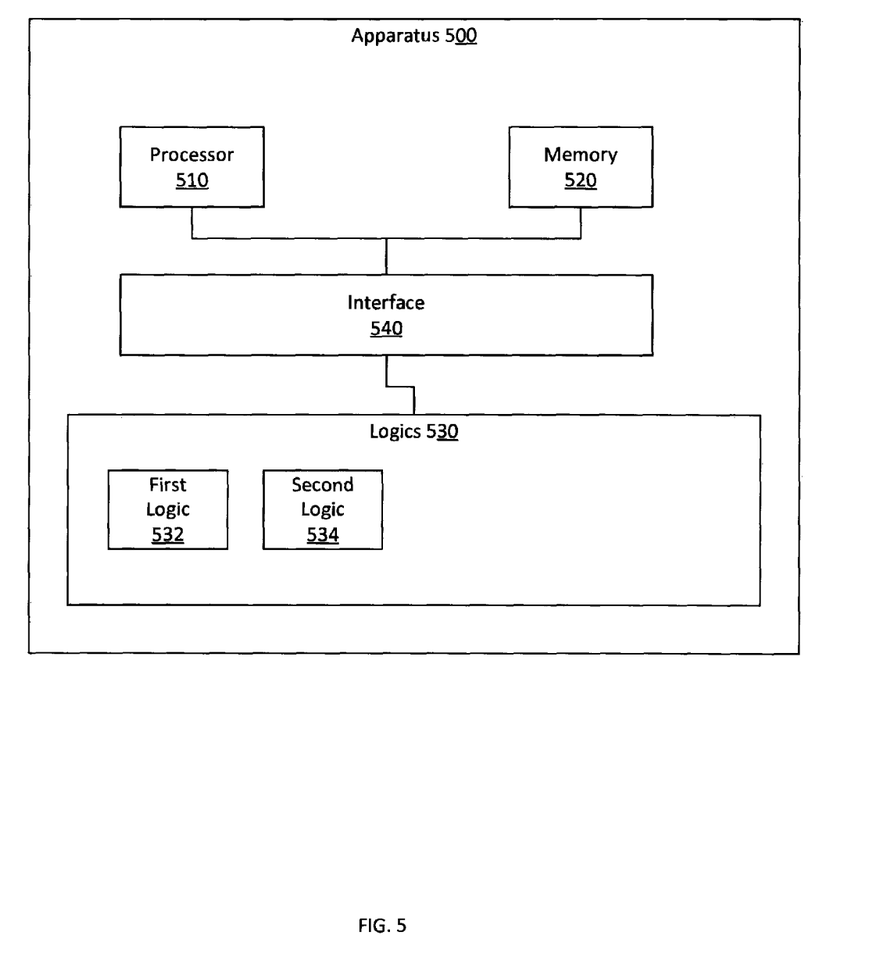
FIG. 5 illustrates an example apparatus configured to perform program identifier based recording.

FIG. 5 illustrates an apparatus 500 that includes a processor 510, a memory 520, a set 530 of logics, and an interface 540 that connects the processor 510, the memory 520, and the set 530 of logics. Apparatus 500 may be, for example, a television, a computer, a laptop computer, a tablet computer, a personal electronic device, a smart phone, or other device that receives content that may be recorded.

In one embodiment the apparatus 500 may be a general purpose computer that has been transformed into a special purpose computer through the inclusion of the set 530 of logics. The set 530 of logics may be configured to facilitate program identifier based recording. In one embodiment, the methods described herein may be performed by apparatus 500. Apparatus 500 may interact with other apparatus, processes, and services through, for example, a computer network.

The set 530 of logics may include a first logic 532 that is configured to identify a fragment to record. In one embodiment, the first logic 532 is configured to identify the fragment based on a program identifier (PI) located in the fragment. The fragment may be, for example, a fragmented MPEG-4 fragment.

The set 530 of logics may also include a second logic 534 that is configured to record fragments identified as fragments to be recorded by the first logic 532. In one embodiment, the second logic 534 may be configured to record the fragment from a communication source from which the first logic 532 identified the fragment. In another embodiment, the second logic 534 may be configured to record the fragment from a communication source other than the communication source from which the first logic 532 identified the fragment.

In one embodiment, memory 520 may store fragments so that the fragments can be examined later. Thus, in one embodiment, the first logic 532 is configured to examine the memory 520 to identify the fragment. The first logic 532 may act in response to different initiating actions. In one example, the first logic 532 is configured to examine the memory 520 in response to a user initiated action, a scheduled action, a periodic action, an event-driven action, or another action.

In different embodiments, some processing may be performed on the apparatus 500 and some processing may be performed by an external service or apparatus. Thus, in one embodiment, apparatus 500 may also include a communication circuit that is configured to communicate with an external source to facilitate receipt or transmission of items including, but not limited to, identifiers of fragments to be recorded or recording control signals. In one example, the first logic 532 may be configured to identify fragments on the apparatus 500. But in another example, the first logic 532 may be configured to request fragment identification from a service located off the apparatus 500.

Figure 6:
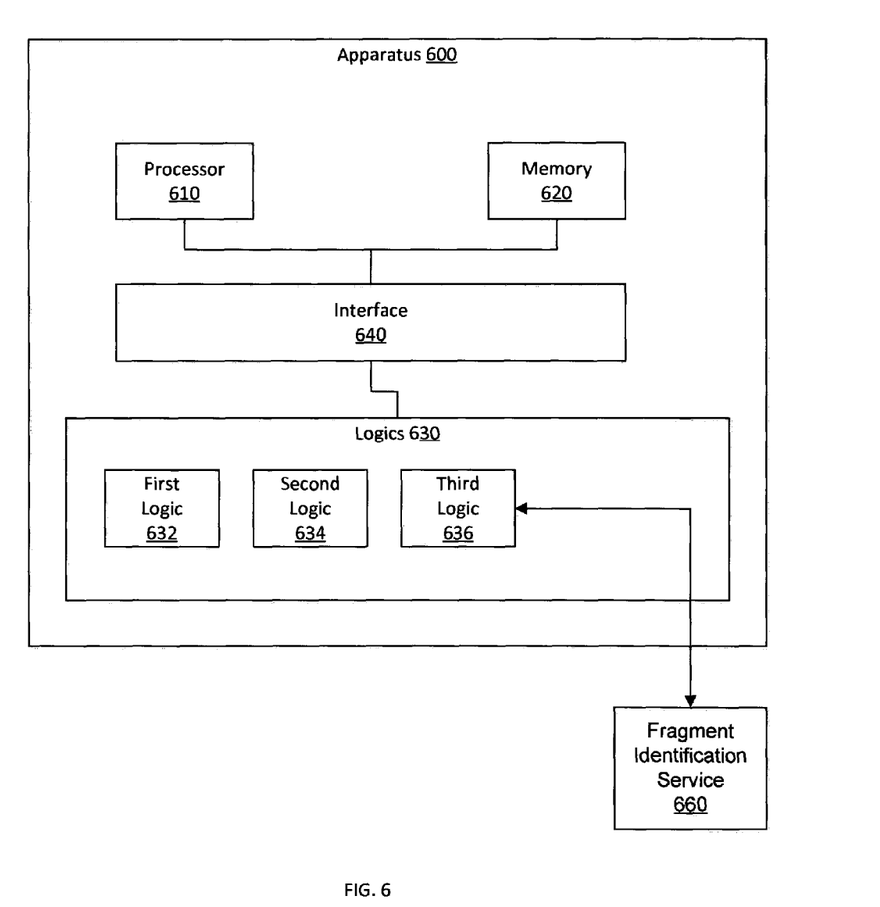
FIG. 6 illustrates an example apparatus configured to perform program identifier based recording.

FIG. 6 illustrates an apparatus 600 that is similar to apparatus 500 (FIG. 5). However, apparatus 600 includes an additional logic 636. Third logic 636 may be configured to receive an identification signal from a service 660 located external to the apparatus 600. The third logic 636 may examine the signal and then control the second logic 634 to record the fragment based, at least in part, on the identification signal. The service 660 may be, for example, a fragment identification service.

Figure 7:
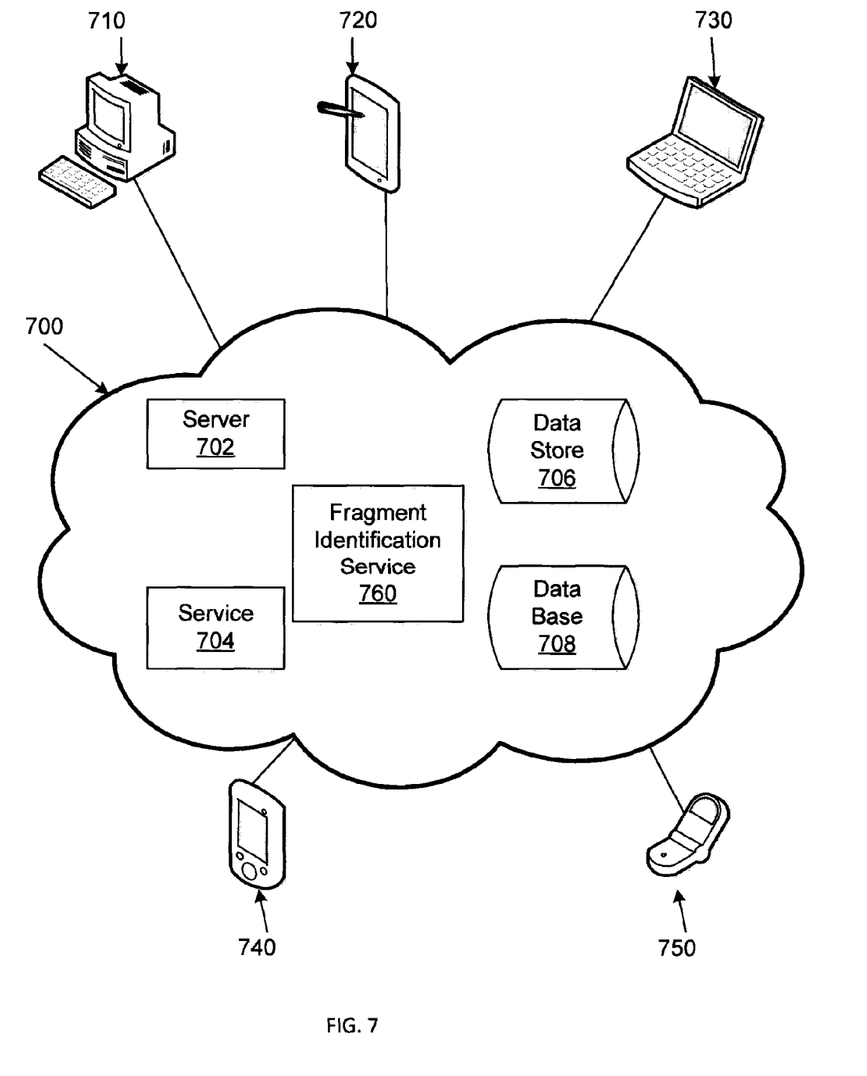
FIG. 7 illustrates an example cloud operating environment.

FIG. 7 illustrates an example cloud operating environment 700. A cloud operating environment 700 supports delivering computing, processing, storage, data management, applications, and other functionality as an abstract service rather than as a standalone product, Services may be provided by virtual servers that may be implemented as one or more processes on one or more computing devices. In some embodiments, processes may migrate between servers without disrupting the cloud service. In the cloud, shared resources (e.g., computing, storage) may be provided to computers including servers, clients, and mobile devices, over a network. Different networks (e.g., Ethernet, Wi-Fi, 802.x, cellular) may be used to access cloud services. Users interacting with the cloud may not need to know the particulars (e.g., location, name, server, database) of a device that is actually providing the service (e.g., computing, storage). Users may access cloud services via, for example, a web browser, a thin client, a mobile application, or in other ways.

FIG. 7 illustrates an example fragment identification service 760 residing in the cloud 700. The fragment identification service 760 may rely on a server 702 or service 704 to perform processing and may rely on a data store 706 or database 708 to store data. While a single server 702, a single service 704, a single data store 706, and a single database 708 are illustrated, multiple instances of servers, services, data stores, and databases may reside in cloud 700 and may, therefore, be used by the fragment identification service 760.

FIG. 7 illustrates various devices accessing the fragment identification service 760 in the cloud 700. The devices include a computer 710, a tablet 720, a laptop computer 730, a personal digital assistant 740, and a mobile device (e.g., cellular phone, satellite phone) 750. The fragment identification service 760 facilitates examining a program identifier located in a fragment and identifying the fragment as a fragment to be recorded. Thus, it is possible that different users at different locations using different devices may access the fragment identification service 760 through different networks or interfaces. In one example, the fragment identification service 760 may be accessed by a mobile device 750. In another example, portions of fragment identification service 760 may reside on a mobile device 750.

Figure 8:
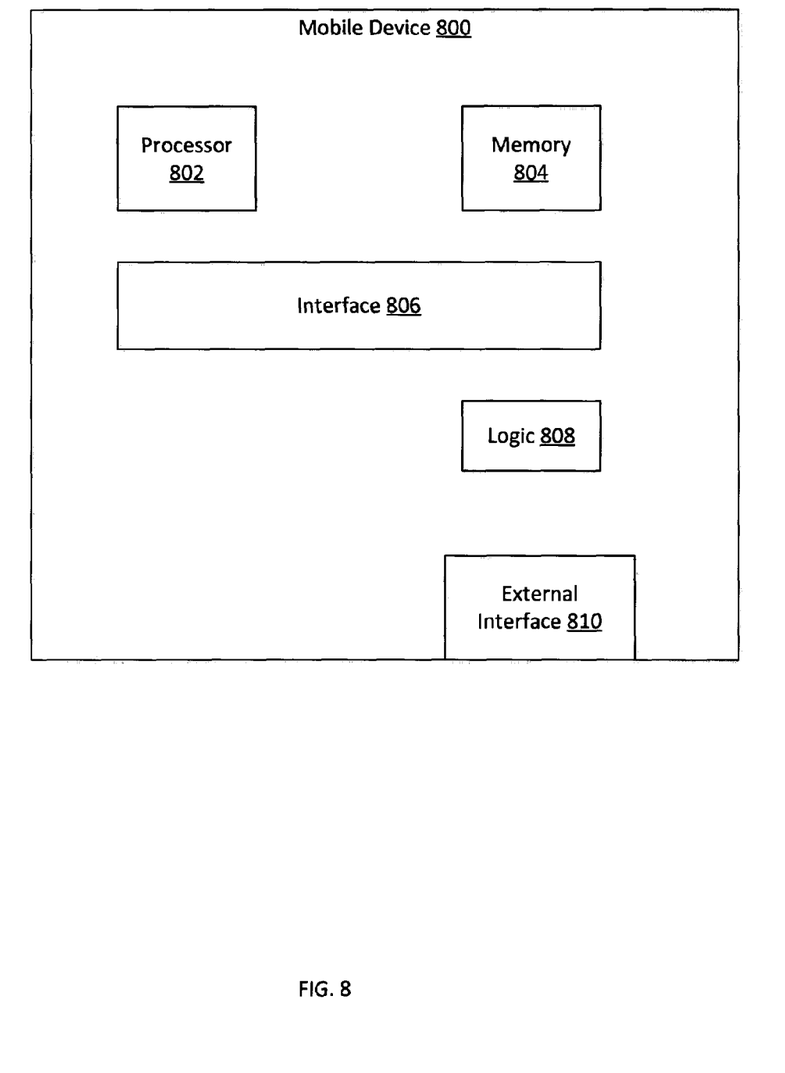
FIG. 8 illustrates an example mobile computing device configured to perform program identifier based recording.

FIG. 8 illustrates an example mobile device 800. Mobile device 800 includes a processor 802, a memory 804, a logic 808, and an external interface 810 that may be connected by an interface 806. Mobile device 800 may be, for example, a cellular telephone, a network telephone, a satellite telephone, or other device. Generally describing an example configuration of the mobile device 800, the processor 802 may be a variety of various processors including dual microprocessor and other multi-processor architectures. The memory 804 may include volatile memory or non-volatile memory. Non-volatile memory may include, for example, read only memory (ROM), programmable ROM (PROM), and other memory. Volatile memory may include, for example, random access memory (RAM), dynamic RAM (DRAM), and other memory. The memory 804 can store an operating system that controls and allocates resources of the mobile device 800. The memory 804 may also store fragment identifiers or fragments to be identified.

The interface 806 may be a single internal bus interconnect architecture or other bus or mesh architectures. While a single bus is illustrated, it is to be appreciated that the mobile device 800 may communicate with various devices, logics, and peripherals using other busses (e.g., PCIE, 1394, USB, Ethernet). The interface 806 can be types including, for example, a memory bus, a memory controller, a peripheral bus, an external bus, a crossbar switch, or a local bus.

The mobile device 800 can operate in a network environment and thus may be connected to a network through network devices via the external interfaces 810. The mobile device 800 may be logically connected to remote computers through the network and the network devices. Through the network, the mobile device 800 may also be connected to services (e.g., service 760, FIG. 7) provided in the cloud (e.g., cloud 700, FIG. 7). Networks with which the mobile device 800 may interact include, but are not limited to, a local area network (LAN), a wide area network (WAN), a telephony network, a telephony system, a cellular system, a satellite system, and other networks.

Mobile device 800 may include a special purpose logic 808 that is configured to provide a functionality for the mobile device 800. For example, logic 808 may provide a client for interacting with a service (e.g., service 760, FIG. 7), or for performing fragment identification or recordation control.

The following includes definitions of selected terms employed herein. The definitions include various examples or forms of components that fall within the scope of a term and that may be used for implementation. The examples are not intended to be limiting. Both singular and plural forms of terms may be within the definitions.

References to "one embodiment", "an embodiment", "one example", and "an example" indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Data store", as used herein, refers to a physical or logical entity that can store data. A data store may be, for example, a database, a table, a file, a list, a queue, a heap, a memory, a register, and other physical repository. In different examples, a data store may reside in one logical or physical entity or may be distributed between two or more logical or physical entities.

"Logic", as used herein, includes but is not limited to hardware, firmware, software in execution on a machine, or combinations of each to perform a function(s) or an action(s), or to cause a function or action from another logic, method, or system. Logic may include a software controlled microprocessor, a discrete logic (e.g., ASIC), an analog circuit, a digital circuit, a programmed logic device, a memory device containing instructions, and other physical devices. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the Applicant intends to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one of, A, B, and C" is employed herein, (e.g., a data store configured to store one of, A, B, and C) it is intended to convey the set of possibilities A, B, C, AB, AC, BC, or ABC (e.g., the data store may store only A, only B, only C, A&B, A&C, B&C, or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

To the extent that the phrase "one or more of, A, B, and C" is employed herein, (e.g., a data store configured to store one or more of, A, B, and C) it is intended to convey the set of possibilities A, B, C, AB, AC, BC, ABC, AA . . . A, BB . . . B, CC . . . C, AA . . . ABB, . . . B, AA . . . ACC . . . C, BB . . . BCC . . . C, or AA . . . ABB . . . BCC . . . C (e.g., the data store may store only A, only B, only C, A&B, A&C, B&C, A&B&C, or other combinations thereof). It is not intended to require one of A, one of B, and one of C. When the applicants intend to indicate "at least one of A, at least one of B, and at least one of C", then the phrasing "at least one of A, at least one of B, and at least one of C" will be employed.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method, comprising:
   monitoring a first input stream;
   identifying a fragmented MPEG-4 (f-MP4) fragment on the first input stream and a second input stream carrying the same content at a different quality level, based, at least in part, on a program identifier (PI) encoded as a universally unique identifier (UUID) in the fragment, where the PI identifies at least one of a specific episode of a specific television show, and a specific portion of a televised event, where the UUID is based on an actual uniqueness, a substantial uniqueness, or a statistical uniqueness, and where the f-MP4 fragment has a sub-logical, sub-semantic granularity, and stores less than two seconds of video content; and
   selectively recording the fragment from the second input stream, the first input stream and the second input stream being synchronized with respect to f-MP4 fragment alignment, where being synchronized with respect to f-MP4 fragment alignment comprises the second input stream and the first input stream being aligned with respect to at least one of: fragment boundaries, a known offset time, and time of reception, based, at least in part, on the PI.

2. The method of claim 1, comprising:
identifying the fragment in a data store, outside a predicted delivery time.

3. The method of claim 1, comprising:
selectively recording the fragment based on a combination of the PI and a time at which the fragment was received.

4. The method of claim 1, comprising:
selectively recording the fragment based on a combination of the PI and a channel on which the fragment was received.

5. The method of claim 1, comprising:
selectively recording the fragment based on a combination of the PI, a time at which the fragment was received, and a channel on which the fragment was received.

6. The method of claim 1, comprising:
controlling one of, a television, a laptop computer, a tablet computer, and a smart phone to identify and record the fragment.

7. The method of claim 1, comprising:
controlling a cloud service to identify the fragment; and
controlling one of, a television, a laptop computer, a tablet computer, and a smart phone to record the fragment based, at least in part, on an identification provided by the cloud service.

8. The method of claim 1, where the fragmented MPEG-4 (f-MP4) fragment is a single f-MP4 fragment.

9. The method of claim 1, where the fragmented MPEG-4 (f-MP4) fragment is a single MP14 ISO/IEC 14496-12 fragment.

10. A computer-readable storage medium storing computer-executable instructions that when executed by a computer control the computer to perform a method, the method comprising:
monitoring a first input stream and a second input stream, where the first input stream and the second input stream carry the same content at a different quality level;
identifying a fragmented MPEG-4 (f-MP4) fragment based on a value of a program identifier (PI) encoded in a universally unique identifier (UUID) field in the fragment, where the UUID is based on an actual uniqueness, a substantial uniqueness, or a statistical uniqueness, where the f-MP4 fragment has a sub-logical, sub-semantic granularity, and stores less than two seconds of video content and where the PI identifies at least one of a specific episode of a specific television show, and a specific portion of a televised event and
selectively recording the fragment based, at least in part, on the PI encoded in the UUID field,
where the fragment is identified on one of, the first in stream from which the f-MP4 fragment is to be recorded, the second input stream other than the first input stream from which the f-MP4 fragment is to be recorded, and a data store, where fragments appearing on the first input stream and on the second input stream are aligned on at least one of fragment boundaries, a known offset time, and time of reception,
where recording the fragment is based on a combination of the PI encoded in the UUID field, a time at which the fragment was received, and a channel on which the fragment was received,
where identifying the fragment comprises controlling one of, a television, a digital video recorder, a laptop computer, a tablet computer, a smart phone, and a cloud-based service to identify the fragment, and
where recording the fragment comprises controlling one of, a television, a digital video recorder, a laptop computer, a tablet computer, a a smart phone, and a cloud-based service to record the fragment.

11. An apparatus, comprising:
a processor,
a memory
a set of logics configured to selectively record digital content fragment; and
an interface to connect the processor, the memory, and the set of logics;
the set of logics comprising:
a first logic configured to identify, from a first communication source having a first quality, a fragmented MPEG-4 fragment to record based on a program identifier (PI) located in the fragment, and at least one other criteria or combinations of criteria, where the PI is based on a actual uniqueness, a substantial uniqueness, or a statistical uniqueness, and where the criteria comprise a time at which the fragment was received, a channel on which the fragment was received, and a time at which the fragment was received combined with a channel on which the fragment was received; and
a second logic configured to record the fragment, from a second, communication source having a second, higher quality, where the f-MP4 fragment has a sub-logical, sub-semantic granularity, and stores less than two seconds of video content.

12. The apparatus of claim 11, where the memory is configured to store one or more fragments, and where the first logic is configured to examine the memory to identify the fragment outside a predicted delivery time.

13. The apparatus of claim 12, where the first logic is configured to examine the memory in response to one or more of, a user initiated action, a scheduled action, a periodic action, and an event-driven action.

14. The apparatus of claim 12, where the fragmented MPEG-4 (f-MP4) fragment is a single f-MP4 fragment, stores less than two seconds of video content, or is a single MP14 ISO/IEC 14496-12 fragment.

15. The apparatus of claim 11, the apparatus being a tablet computer.

* * * * *